United States Patent
Gold et al.

(10) Patent No.: US 6,959,377 B2
(45) Date of Patent: Oct. 25, 2005

(54) METHOD AND SYSTEM FOR MANAGING REGISTERS

(75) Inventors: Spencer M. Gold, Pepperell, MA (US); Masooma Bhiawala, Boxboro, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 456 days.

(21) Appl. No.: 10/103,181

(22) Filed: Mar. 20, 2002

(65) Prior Publication Data

US 2003/0182538 A1     Sep. 25, 2003

(51) Int. Cl.$^7$ .............................. G06F 9/30; G06F 9/40
(52) U.S. Cl. ....................... 712/216; 712/219
(58) Field of Search ................. 712/216, 219

(56) References Cited

U.S. PATENT DOCUMENTS

| | | | | |
|---|---|---|---|---|
| 5,673,426 A | * | 9/1997 | Shen et al. | ................. 712/244 |
| 5,974,240 A | * | 10/1999 | Chan | ........................... 712/218 |
| 6,119,223 A | * | 9/2000 | Witt | ............................. 712/244 |
| 6,266,763 B1 | * | 7/2001 | Witt et al. | ..................... 712/36 |

OTHER PUBLICATIONS

Intel Architecture Software Developer's Manual vol. 2: Instruction Set Reference, Intel Corporation, 1997, pp. 1-1, 3-1 to 3-10, 3-17 to 3-20, 3-57 to 3-62, 3-107 to 3-108, 3-241 to 3-244, and 3-448 to 3-451.*

* cited by examiner

Primary Examiner—Daniel H. Pan
(74) Attorney, Agent, or Firm—Lahive & Cockfield, LLP

(57) ABSTRACT

A system and method for memory structures for efficient tracking and recycling of physical register assignments are disclosed. The method and system provide the necessary functionality to allow the number of physical registers assigned to incoming instructions to equal the number of physical registers that are returned to the list of free registers each cycle, thereby maintaining a substantially constant number of physical register pointers in the list of free registers. The system and method reduce the size of the memory structures utilized to track the usage of physical registers and the recycling of these registers.

36 Claims, 5 Drawing Sheets

METHOD AND SYSTEM FOR MANAGING REGISTERS

TECHNICAL FIELD

The present invention generally relates to microprocessors and more particularly, to a method for managing physical registers.

BACKGROUND

Microprocessors typically contain registers that are used in executing instructions. When the microprocessors execute instructions, data values are read from the registers and results of operations are written into the registers. For example, the ADD instruction, R1+R2=R3, adds the values held in registers R1 and R2 and puts the resulting sum into register R3. R1, R2, and R3 are identifiers associated with respective registers. The values being added together, R1 and R2, are referred to as source operands, while R3 is referred to as a destination register.

Traditional microprocessors sequentially execute instructions in a computer program, i.e., in the order that the instructions appear in the computer program. In the simplest case, an instruction is executed per a clock cycle. Many instructions may take more than one clock cycle to execute.

Superscalar processors, in contrast to traditional microprocessors, may issue and receive multiple instructions per clock cycle. With such processors, an instruction can be executed in a single clock cycle if there are no data dependencies, procedural dependencies, or resource conflicts that prevent execution of the instruction.

High performance processors, such as processors that adopt the UltraSPARC™ 5 architecture, use out-of-order processing, i.e., the processors process the instructions non-sequentially. Such high performance processors typically do not have a fixed relationship between a register identifier and the physical register referenced by the identifier. Thus, the identifier R1 may refer to a first physical register in one instruction and refer to a second physical register in another instruction. The identifiers reference logical resisters that are mapped to corresponding physical registers.

One challenge with such processors is to manage and track the usage of registers. One conventional approach is to define an in-order state for each register. For example, if an instruction has been executed and all other previous instructions have also been executed, the values generated by the instructions are stored as the register's in-order state. The instruction is then considered "retired."

With the UltraSPARC™ 5, v. 9 architecture for microprocessors, physical integer registers can store two types of data: an integer destination operand and a condition code register. By allowing each physical register to store a copy of the condition codes, out-of-order instruction execution is made more efficient.

There is, however, a major drawback to storing both the integer destination operands and condition codes together in the integer registers. Determining exactly when a physical register becomes "free" (i.e., it is no longer storing useful data and can therefore be reused) becomes significantly more difficult. This increased difficulty arises because a physical register's destination operand may become obsolete or invalid at a different time than its condition code register. Therefore, physical registers can become partly free before they become entirely free. Unless a register is entirely free, however, it is not practical to reuse it to store additional data.

The difficulty associated with determining when a physical register can be reused becomes problematic when enforcing the requirement, as does the UltraSPARC™ 5 microprocessor, that for each physical register that is assigned to an incoming instruction for use as a destination operand, exactly one physical register must be returned to the list of free physical registers.

SUMMARY

The present invention addresses the above-described limitation by providing memory structures for efficient tracking and recycling of physical register assignments. More specifically, it provides the necessary functionality to allow the number of physical registers assigned to incoming instructions to equal the number of physical registers that are returned to the list of free registers each cycle, thereby maintaining a constant number of physical register pointers in the list of free registers. This approach reduces the size of the memory structures needed to track the usage of physical registers and the recycling of these registers.

In particular, a hold register can be used in the process of determining which physical register to return to the list of free registers. This hold register can be viewed as an overflow register used for storing an extra physical register pointer when an instruction is allocated a single physical register for use as a destination operand, but frees two physical registers. The hold register is also used to provide a free register in the case that an instruction is allocated a free register to use as a destination operand, but cannot free a physical register.

The UltraSPARC™ 5 microprocessor permits the storage of both a destination operand (RD) and the integer condition codes (iCC) in a single physical integer register. A condition code is a flag, or a true/false indicator that a certain condition exists following the execution of an instruction. A condition code register is a set of condition codes, e.g., an 8-bit condition code register can contain 8 condition codes, or flags. Examples of conditions that are tracked in a condition code register include:

zero condition: 1=result produced a zero output, 0=result is not zero negative condition: 1=result is negative, 0=result is zero or positive overflow condition: 1=result fits in number of bits available, 0=result requires more bits than are available carry condition: 1=result produced a carry, 0=result did not produce a carry Eventually, the RD data being stored in every physical integer register becomes obsolete when the associated logical register to which it is mapped is overwritten. If a physical register is storing obsolete RD data, and it is also not storing valid iCC data, it becomes free, or available for reuse as a destination operand by subsequent incoming instructions. However, if a physical register is storing obsolete RD data, but is also storing valid iCC data, it cannot be freed because it is still storing valid data that may be used by subsequent instructions. Until the iCC data becomes obsolete (by a subsequent instruction overwriting the iCC register), the physical register that is being used to store it cannot be returned to the list of free registers.

A system and method for managing the reuse of physical registers can be employed to handle three cases corresponding to three types of scenarios that may arise. The three cases involve instructions in which the iCC register or a logical destination register, such as R1, is originally mapped to a physical register, such as P1, but is later mapped to a different physical register, such as P2, thus making the contents of P1 obsolete. P1 shall hereafter be referred to as the "previous writer" of P2, since it was used to hold the contents of its associated logical register previous to P2 being used to store this data. The system and method can help decide the status of the previous writer P1 by designating P1 as "free," "on hold," or "not free," as discussed below in more detail. The three cases corresponding to three scenarios that may arise are:

Case 1: An instruction is overwriting both a logical register and the condition codes simultaneously. However, the previous writers of the condition codes (iCC) and the destination register (RD) are mapped to different physical registers, creating a situation in which it appears that two physical registers are becoming free while only one physical register is being consumed for use as a destination operand. In this case, the iCC previous writer is designated as "not free," while the RD previous writer is designated as "free" and therefore returned to the list of free registers.

For Case 1, a method is described herein for managing physical registers in a microprocessor. The method includes providing a free physical register list for holding information indicative of a status of the physical registers for managing the physical registers, and fetching a first instruction that causes a first destination register to be mapped to a first physical register. The method also includes fetching a second instruction that causes a condition code register and a second destination register to be mapped to a second physical register, and fetching a third instruction that causes the condition code register and the first destination register to be mapped to a third physical register. The method further includes writing a pointer to the first physical register into the free physical register list.

Case 2: An instruction is overwriting both a logical register and the condition codes simultaneously. However, the previous writer of the condition codes (iCC) are mapped to a physical register that is not currently storing valid RD data, while the destination register (RD) is mapped to yet another physical register that is not currently storing valid iCC data. This creates a situation in which it appers that two physical registers are becoming free while only one physical register is being consumed for use as a destination operand. In this case, the iCC previous writer is designated as "on hold" and placed into the hold register, while the RD previous writer is designated as "free" and returned to the list of free registers.

For Case 2, a method is described herein for managing physical registers in a microprocessor. The method includes providing a free physical register list for holding information indicative of a status of the physical registers, and fetching a first instruction that causes a first destination register to be mapped to a first physical register. The method also includes fetching a second instruction that causes a condition code register to be mapped to a second physical register, the second instruction also including an arithmetic operation producing a result that is mapped to a naught register. In the SPARC™ architecture, the naught register, which is herein denoted as G0, stores a zero value, and is not overwritten. For example, the instruction ADDcc R1+R2=G0 causes the values stored in registers R1 & R2 to be added, and the condition codes to be set appropriately, but does not cause the resulting sum to be stored. The method further includes fetching a third instruction that causes the condition code register and the first destination register to be mapped to a third physical register, and writing a pointer to the first physical register into the free physical register list. Subsequently, a pointer to the second physical register is moved into a hold register.

Case 3: An incoming instruction is received that is overwriting the condition codes only. However, the previous writer of the condition codes (iCC) are mapped to a physical register that is also currently storing valid RD data. This creates a situation in which it appears that no physical register can be freed even though a physical register is being consumed for use as a destination operand. In this case, the physical register in the hold register that is currently designated as "on hold" is returned to the list of free registers.

For Case 3, which arises after Case 2 is encountered, a method is described herein for fetching a fourth instruction that causes the condition code register and a second destination register to be mapped to a fourth physical register. The method also includes fetching a fifth instruction that causes the second destination register to be mapped to a fifth physical register, and writing a pointer to the second physical register into the free physical register list.

BRIEF DESCRIPTION OF THE DRAWINGS

An illustrative embodiment of the present invention will be described below relative to the following drawings.

DETAILED DESCRIPTION

The illustrative embodiment of the present invention provides a microprocessor having a plurality of physical registers and data structures to track and recycle the physical registers. The data structures facilitate efficient management of the registers without hampering performance of the microprocessor. The data structures do not increase the memory requirements for tracking the various physical registers. As such, memory is conserved for other processing purposes.

Figure 1:
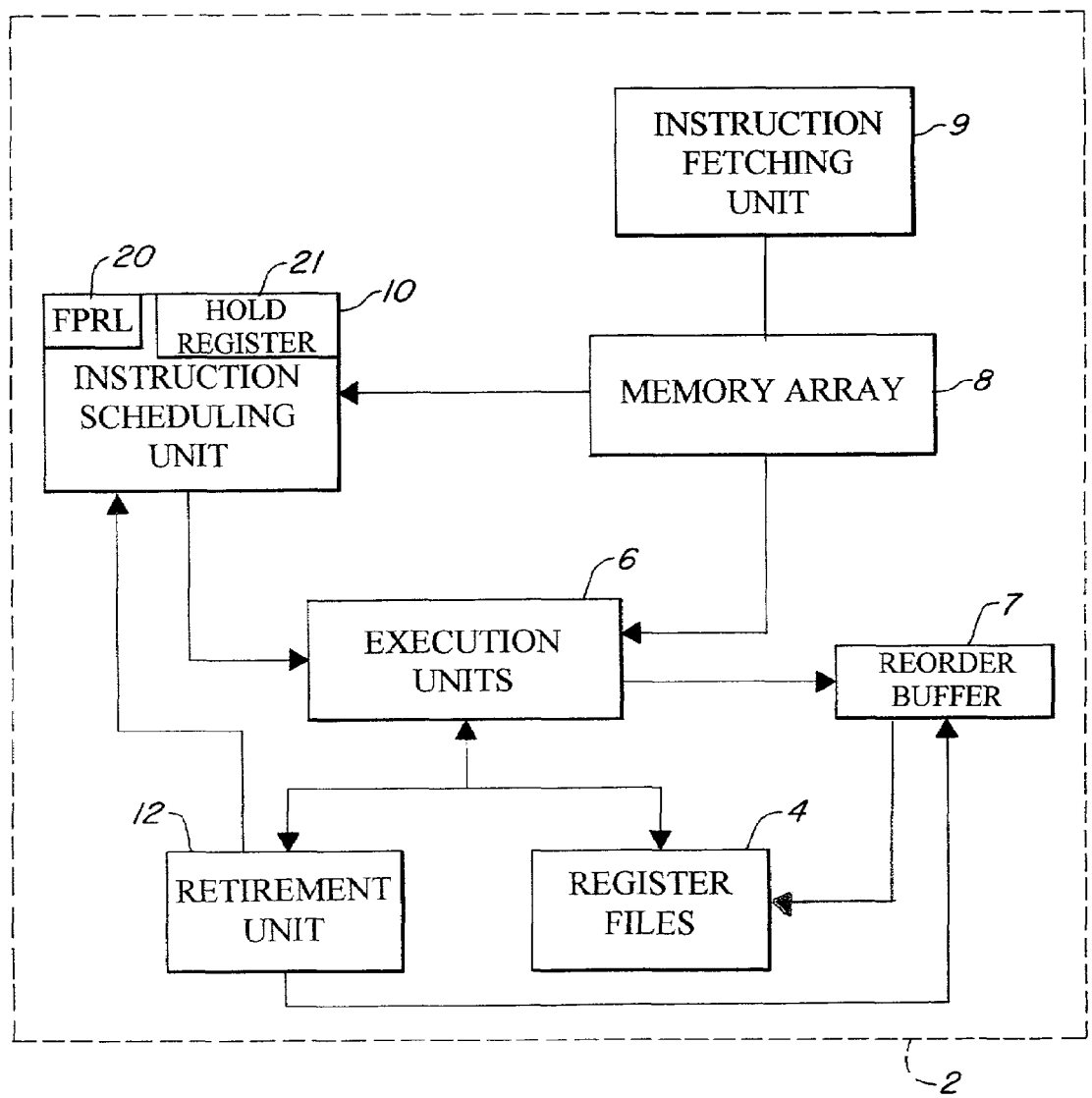
FIG. 1 illustrates a microprocessor suitable for practicing the illustrative embodiment.

FIG. 1 illustrates a microprocessor suitable for practicing the illustrative embodiment. The microprocessor 2 includes a register file 4, an execution unit 6, a reorder buffer 7, a memory array 8, an instruction fetching unit 9, an instruction scheduling unit 10, a retirement unit 12, a free physical register list (FPRL) 20 and a hold register 21.

The microprocessor 2 is of the type designed to handle concurrent multiple instructions during a single processor execution cycle. The execution unit 6 can execute instructions of different types in non-sequential order. For example, the execution unit 6 can access data from the memory array 8, e.g., load and store instructions of a program, perform arithmetic operations, and control execution flow. After the execution unit 6 executes instructions, results can be temporarily stored in the reorder buffer 7.

The register file 4 is used to store floating or fixed-point data. Also, the register file 4 contains information regarding physical registers that are allocated for execution. A logical register can be mapped to any of the physical registers in the register file 4. The retirement unit 12 receives data from the execution unit 6 regarding the execution of the instructions. The retirement unit 12 determines when it is safe to write results of each instruction from the reorder buffer 7 into the register file 4. The register file 4 stores the final results of the instructions executed by the execution unit 6. However, the register files can directly send data to the execution unit 6. The possibility of data being thrown out is high because exceptions or pipeline flushes may occur at any point in time. Thus, the retirement unit 12 manages the exceptions and other possible computational processes for the register files.

The memory array 8 is used to store instructions of programs and data that are processed by the microprocessor 2.

The instruction scheduling unit 10 receives as input the instructions stored in the memory array 8. The instruction scheduling unit 10 schedules the received instructions for processing by the execution unit 6. Moreover, the instruction scheduling unit 10 receives retirement information from the retirement unit 12 for scheduling instructions based on when the necessary source operands are available in the register file 4.

For each incoming instruction into the instruction scheduling unit 10 that requires a destination register, a specific physical register within the processor's register file 4 is assigned to store the results of the incoming instruction, i.e., act as the temporary holding cell for each resultant value. The process of assigning physical registers to temporarily hold the values referenced by an architectural register is referred to as "register mapping."

The instruction scheduling unit 10 performs register mapping, tracks these mappings as instructions progress through the processor, and also ensures that each physical register is reused when it is no longer needed.

The processor 2 reads instructions, executes the instructions in the execution unit 6, and stores the result of the instructions in the reorder buffer 7. The result of the instructions are then transferred from the reorder buffer 7 to the register file 4, at which point the instructions are retired. For example, an instruction may be fetched that adds two numbers and then stores the result in a logical destination register that is mapped to a newly assigned free physical register. When the processor 2 fetches such instructions, the physical register that was used to previously store the contents of the logical register being overwritten by the current instruction is potentially becoming obsolete, and is therefore designated as potentially free. After the current instruction retires, thus updating the formal state of the processor 2, the potentially free physical register has become officially obsolete and is therefore free to be reused. The free physical register list (FPRL) 20 is a memory structure that keeps track of registers that are either potentially or truly not being used, and are therefore designated as "free." A physical register number is provided for each instruction that requires a destination register. Once a physical register is assigned, or mapped, it is no longer considered "free" because it is now "in-use."

The FPRL 20 essentially acts as a first-in-first-out (FIFO) buffer with free physical register pointers being written into the FPRL 20, and then being read out as free physical register pointers in the same order. However, in order to operate efficiently with a fixed capacity, the FPRL must write only one free physical register pointer into the FIFO buffer for each free physical register pointer that is read out of the FIFO. Therefore, each instruction that requires a physical register for use as a destination operand must also produce a physical register pointer that can re-enter the FPRL as a free register.

Figure 2:
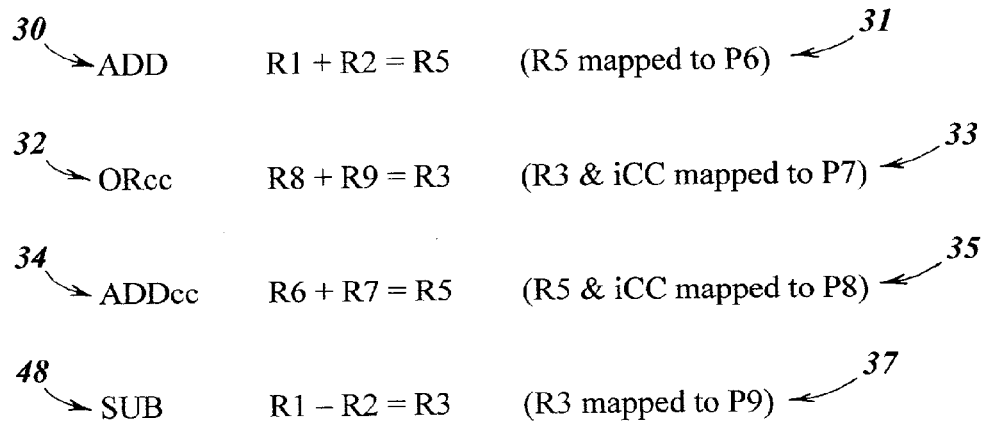
FIG. 2 shows an instruction management method that illustrates the present invention.

Referring to FIG. 2, which illustrates Case 1 described above, an example of a sequence of instructions is shown to illustrate the instruction management method of an illustrative embodiment of the present invention. A first instruction 30, a second instruction 32, and a third instruction 34 are shown. Also shown, in parentheses, are a first action 31, a second action 33, and a third action 35 that occur when the respective instructions are completed.

In the example shown in FIG. 2, the third instruction 34 is overwriting both the contents of logical register R5 and the iCC register. The contents of R5 were previously stored in P6 (due to the first instruction 30), while the contents of the iCC register were previously stored in P7 (due to the second instruction 32). Therefore, it appears that the ADDcc instruction 34 is making the contents of two different physical registers (P6 and P7) obsolete, thereby making them both eligible to return to the FPRL 20 as free registers. However, the ADDcc instruction 34 is consuming only one physical register for use as a destination operand, making it possible to return only one of the two eligible physical registers to the FPRL 20. In this scenario, the ADDcc instruction 34 is only invalidating the iCC portion of the previous writer of P8 (which is P7 in this case). Therefore, P7 continues to hold valid RD data, which is the results of the logical OR performed by the ORcc instruction, and cannot be returned to the FPRL at this time. The P7 register eventually reappears as a previous writer when the R3 register is reused as a destination register. When that happens (i.e., when the fourth instruction 48 is received), P7 is made entirely obsolete and a pointer to P7 is then written into the FPRL 20. Therefore, to correctly process this instruction sequence, the ADDcc instruction 34 writes a pointer to P6 into the FPRL 20 and the SUB instruction 48 writes a pointer to P7 into the FPRL 20.

In particular, the memory array 8 stores the first, second, and third instruction 30, 32, and 34. The instruction fetching unit 9 fetches the first instruction 30 that causes the instruction scheduling unit 10 to map the first destination register R5 to the first physical register P6 in the first action 31. The instruction fetching unit 9 also fetches the second instruction 32 that causes the instruction scheduling unit 10 to map the condition code register iCC and the second destination register R3 to the second physical register P7 in the second action 33. In addition, the instruction fetching unit 9 fetches the third instruction 34 that causes the instruction scheduling unit 10 to map the condition code register iCC and the first destination register R5 to the third physical register P8 in the third action 35. While each of these instructions consumes a physical register for use as a destination register, they also produce a physical destination register pointer to be written into the FPRL 20. Thus, the third instruction 34 causes a pointer to the first physical register P6 to be written into the FPRL 20 and designated as "free"; that is, with particular reference to the third instruction 34, a pointer to the first physical register P6 is written into the FPRL 20 and designated as "free."

The instruction fetching unit 9 may also fetch a fourth instruction 48 stored in the memory array 8 that causes the instruction scheduling unit 10 to map the second destination register R3 to a fourth physical register P9 in a fourth action 37. As a result, a pointer to the second physical register P7 is written into the FPRL 20.

The execution unit 6 may then execute the first, second, third, and fourth instruction 30, 32, 34, and 48, thereby producing a first instruction result, a second instruction result, a third instruction result, and a fourth instruction result, respectively. The reorder buffer 7 can store the first, second, third, and fourth instruction results. The retirement unit 12 can then retire the first, second, third, and fourth instruction 30, 32, 34, and 48 after the reorder buffer 7 stores the instruction results. The first physical register P6 becomes eligible for reuse as a destination register after the third instruction 34 retires. Also, the second physical register P7 becomes eligible for reuse as a destination register after the fourth instruction 48 retires.

Figure 3:
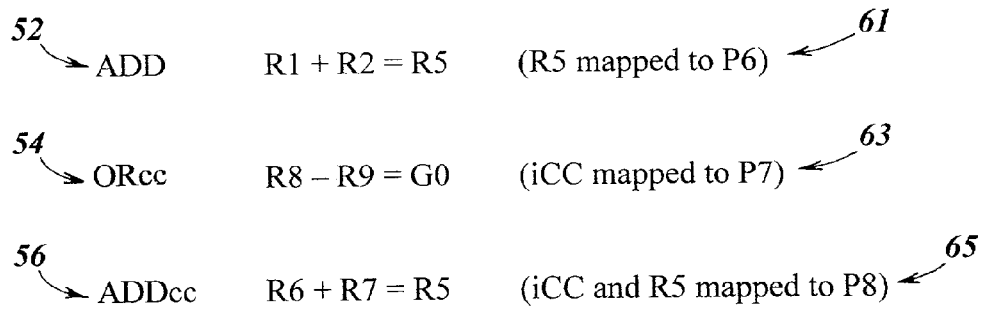
FIG. 3 shows another instruction management method that illustrates the present invention.

Referring to FIG. 3, which illustrates Case 2 described above, another example of a sequence of instructions is shown to illustrate the instruction management method of the present invention. This instruction stream is similar to the example discussed above, except that an ORRcc instruction 54 with a destination of G0 is used. When an instruction uses a naught register, such as G0, as a destination register, a physical register is not assigned to that instruction for use as a destination register, unless that instruction also writes to the condition codes. Since G0 is a naught register, and cannot be used to store a value other than zero, this eliminates the possibility that P7 will reappear later as a previous writer, as in the previous example. To correctly process streams of instructions such as this, a hold register 21 is added to the write path of the FPRL 20. The hold register 21 is designed to temporarily hold, under certain conditions, physical register pointers that are being used to store the iCC register.

In the example illustrated in FIG. 3, it appears that the ADDcc instruction 56 is making obsolete two different physical registers, namely P6 and P7, since it is overwriting the contents of the logical register R5 and the iCC register, which were previously being stored in physical registers P6 and P7, respectively. Therefore, the ADDcc instruction 56 appears to need to write pointers to two different previous writer physical registers into the FPRL 20. However, since the ADDcc instruction 56 is consuming only one physical register for use as a destination operand, it can only return one free physical register pointer to the FRL 20. Therefore, a pointer to the P6 register is written into the FPRL 20 and designated as "free," while a pointer to the P7 physical register is moved into the hold register and designated as "on hold" where it remains until an opportunity presents itself to designate it as "free" and move it into the FPRL 20.

In particular, the memory array 8 stores a first, second, and third instruction 52, 54, and 56. The instruction fetching unit 9 fetches the first instruction 52 that causes the instruction scheduling unit 10 to map a first destination register R5 to a first physical register P6 in a first action 61. The instruction fetching unit 9 also fetches the second instruction 54 that causes the instruction scheduling unit 10 to map the iCC register to a second physical register P7 in a second action 63. The second instruction 54 also includes an arithmetic operation producing a result that is mapped to a naught register G0. In addition, the instruction fetching unit 9 fetches the third instruction 56 that causes the instruction scheduling unit 10 to map the iCC register and the first destination register R5 to a third physical register P8 in a third action 65. While each of these instructions consumes a physical register for use as a destination register, each also produce a physical destination register pointer to be written into the FPRL 20. With particular reference to the third instruction 56, a pointer to the physical register P6 is written into the FPRL 20 and designated as "free." A pointer to the second physical register P7 is moved into a hold register, where it remains until an unused slot becomes available in the FPRL 20 (see below).

Figure 4:
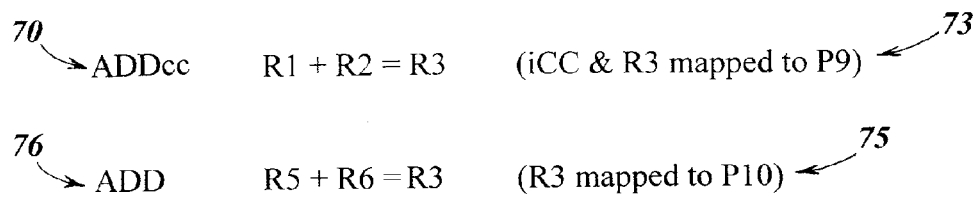
FIG. 4 shows yet another instruction management method that illustrates the present invention.

Referring to FIG. 4, which illustrates Case 3 described above, another example of a sequence of instructions is shown to illustrate the instruction management method of the present invention. The instructions in this figure are appended to those in FIG. 3. In this method, the ADD instruction 76 appears at first to make obsolete the contents of the previous writer of P10, which in this case is P9. However, P9 is currently storing valid iCC register values. Therefore, a pointer to P9 cannot yet be designated as "free" and written into the FPRL 20. Since ADD instruction 76 consumes a physical register for use as a destination operand, it must also produce a free physical register pointer to be written into the FPRL 20. To correctly process the ADD instruction 76, the physical register pointer being stored in the hold register at that time is then designated as "free" and written into the FPRL 20.

Under these conditions, the hold register holds a valid register pointer because the ADDcc instruction 56 placed the previous writer of iCC into the hold register. It is also safe to move the hold register contents to the free physical register list 20 because the iCC register must have been overwritten in order to cause this scenario.

The P9 register will reappear as a previous writer when an instruction that overwrites the iCC is received, whereupon it will be designated as "free" and its pointer is written into the FPRL 20.

In particular, the instruction fetching unit 9 fetches the fourth instruction 70 stored in the memory array 8 that cause the instruction scheduling unit 10 to map the iCC register and a second destination register R3 to a fourth physical register P9 in a fourth action 73. In addition, the unit 10 fetches a fifth instruction 76 stored in the memory array 8 that causes the instruction scheduling unit 10 to map the second destination register R3 to a fifth physical register P10 in a fifth action 75. While both instructions 70 and 76 consume a single physical register for use as a destination register, they also produce a physical destination register pointer to be written into FPRL 20. With particular reference to the fifth instruction 76, a pointer to the physical register P7 (which is the register being stored in the hold register) is written into the FPRL 20.

The execution unit 6 executes the first, third, fourth and fifth instruction 52, 56, 70, and 76, thereby producing a first instruction result, a third instruction result, a fourth instruction result, and a fifth instruction result, respectively. The buffer 7 stores the first, third, fourth, and fifth instruction results. (Since it involves a naught register, the second instruction 54 does not cause the algebraic result to be stored.) The retirement unit 12 retires the first, third, fourth, and fifth instruction after the reorder buffer 7 stores the instruction results, wherein the first physical register P6 becomes eligible for reuse as a destination register after the third instruction 56 retires.

Figure 5:
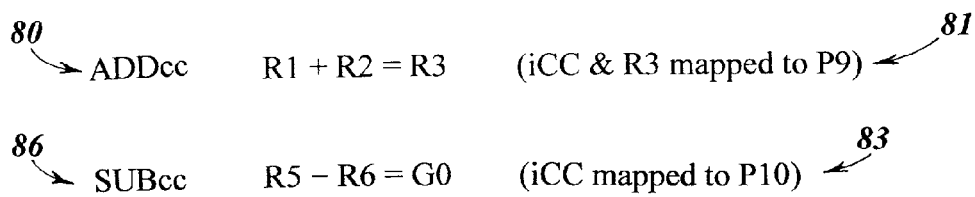
FIG. 5 shows an instruction management method, which is a variant of the method presented in FIG. 4, that illustrates the present invention.

Referring to FIG. 5, an instruction management method alternative to FIG. 4 is shown illustrating the present invention. The instructions in this figure are appended to those in FIG. 3.

This example resembles the preceding case in that the SUBcc instruction 86 is overwriting the iCC register, but is not overwriting an RD portion of a logic register due to the use of the naught register as a destination. Therefore, the SUBcc instruction 86 cannot designate the physical register P9 as "free" because it is still holding valid RD data (i.e., the results of the ADDcc operation from instruction 80). Since the SUBcc instruction 86 is consuming a physical register for use as an iCC destination operand, it must also produce a single physical register pointer to be written into FPRL 20. To correctly process the SUBcc instruction 86, the physical register pointer being stored in the hold register at that time is then designated as "free" and written into the FPRL 20.

In particular, the instruction fetching unit 9 fetches a fourth instruction 80 stored in the memory array 8 that causes the instruction scheduling unit 10 to map the iCC register and a second destination register R3 to a fourth physical register P9 in a fourth action 81. In addition, the instruction scheduling unit 10 fetches a fifth instruction 86 stored in the memory array 8 that cause the instruction scheduling unit 10 to map the condition code register iCC to a fifth physical register P10 in a fifth action 83. The fifth instruction 86 also includes a second arithmetic operation producing a second result that is mapped to a second naught register 90. While both instructions 80 and 86 consume a single physical register for use as a destination register, they must also produce a physical destination register pointer to be written into the FPRL 20. With particular reference to the fifth instruction 86, a pointer to the physical register P7 (which is the register being stored in the hold register) is written into the FPRL 20.

The execution unit 6 executes the first, third, fourth and fifth instruction 52, 56, 80, and 86, thereby producing a first instruction result, a third instruction result, a fourth instruction result, and a fifth instruction result, respectively. The reorder buffer 7 stores the first, third, fourth, and fifth instruction results. The retirement unit 12 retires the first, third, fourth, and fifth instruction after the reorder buffer 7 stores the instruction results, wherein the first physical register P6 becomes eligible for reuse as a destination register after the third instruction 56 retires.

Instead of the method presented in FIG. 3, where a pointer to the first physical register P6 is written into the FPRL 20 and a pointer to the iCC register is moved into the hold register, in another embodiment, the reverse can occur; that is, a pointer the iCC register can be written into the FPRL 20, and a pointer to the first physical register P6 can be moved into the hold register. In this different embodiment, the methods in FIGS. 4 and 5 that append the method in FIG. 3 can be consistently modified by analogy.

Figure 6:
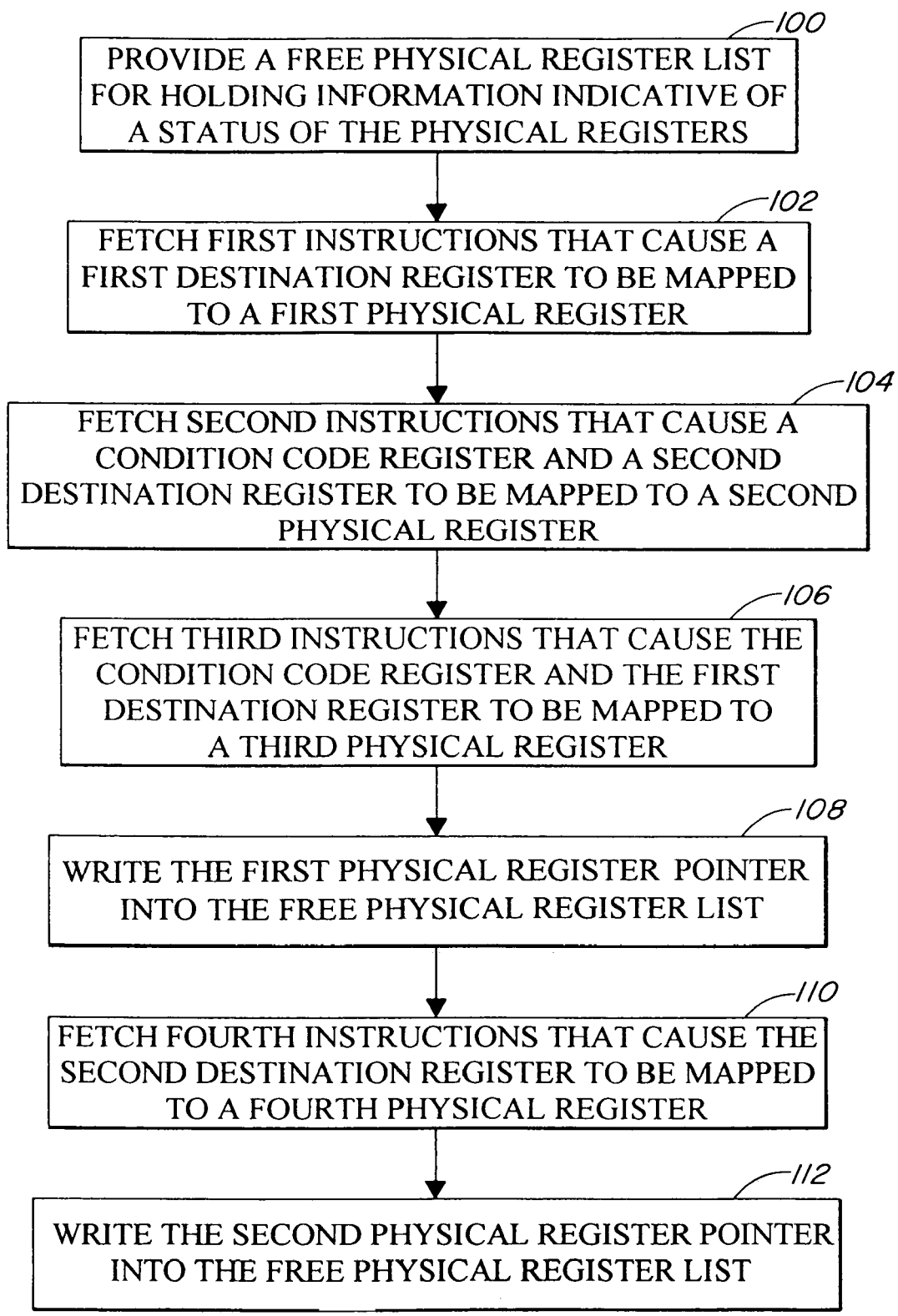
FIG. 6 shows a flowchart for managing physical registers in a microprocessor, in accordance with one embodiment of the present invention.

Referring to FIG. 6, a flowchart for managing physical registers in a microprocessor is shown. In step 100, an FPRL 20 for holding information indicative of the availability of the physical registers is provided. In step 102, a first instruction is fetched that causes a first destination register to be mapped to a first physical register. In step 104, a second instruction is fetched that causes a condition code register and a second destination register to be mapped to a second physical register. In step 106, a third instruction is also fetched that causes the condition code register and the first destination register to be mapped to a third physical register. Subsequently, in step 108, a pointer to the first physical register is written into the FPRL 20.

In step 110, a fourth instruction is fetched that causes the second destination register to be mapped to a fourth physical register. Subsequently, in step 112, a pointer to the second physical register is written into the FPRL 20.

Next, the first, second, third, and fourth instruction are executed, thereby producing a first instruction result, a second instruction result, a third instruction result, and a fourth instruction result. The first, second, third, and fourth instruction results are buffered temporarily. After the step of buffering, the first, second, third, and fourth instruction are retired, and, after the third instruction retires, the first physical register becomes eligible for reuse as a destination register.

Figure 7:
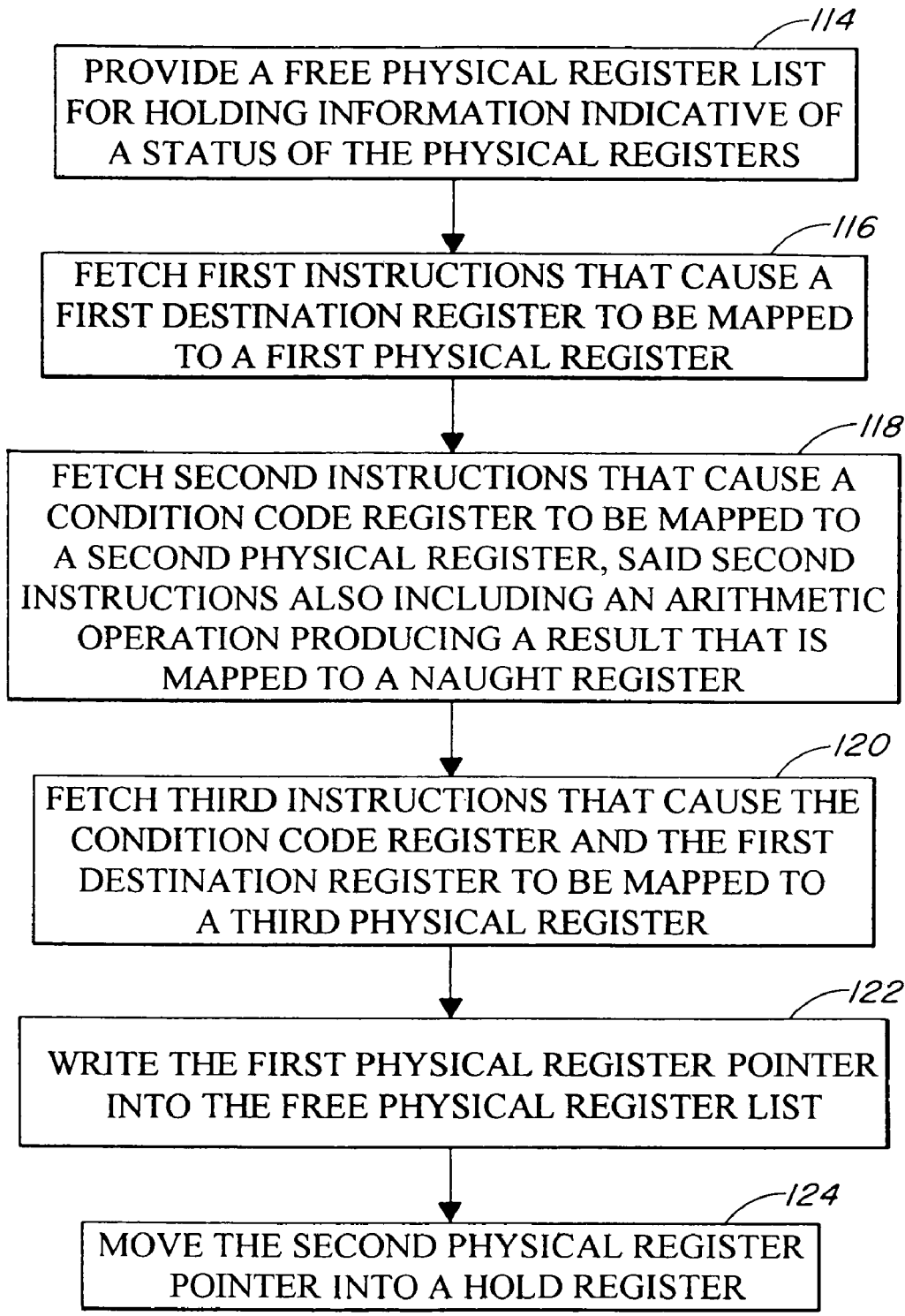
FIG. 7 shows another flowchart for managing physical registers in a microprocessor that utilizes a hold register, in accordance with one embodiment of the present invention.

Another scenario where the principles of the present invention can be used to manage physical registers in a microprocessor is illustrated in FIG. 7, where a flowchart for managing physical registers in a microprocessor is shown. In step 114, a free physical register list is provided for holding information indicative of the availability of the physical registers. In step 116, a first instruction is fetched that causes a first destination register to be mapped to a first physical register. In step 118, a second instruction is fetched that causes a condition code register to be mapped to a second physical register. The second instruction also includes an arithmetic operation producing a result that is mapped to a naught register. In step 120, a third instruction is also fetched that causes the condition code register and the first destination register to be mapped to a third physical register. Subsequently, in step 122, a pointer to the first physical register is written into the FPRL 20. In step 124, the second physical register is designated as "on hold" and a pointer to the second physical register is moved into a hold register.

Figure 8:
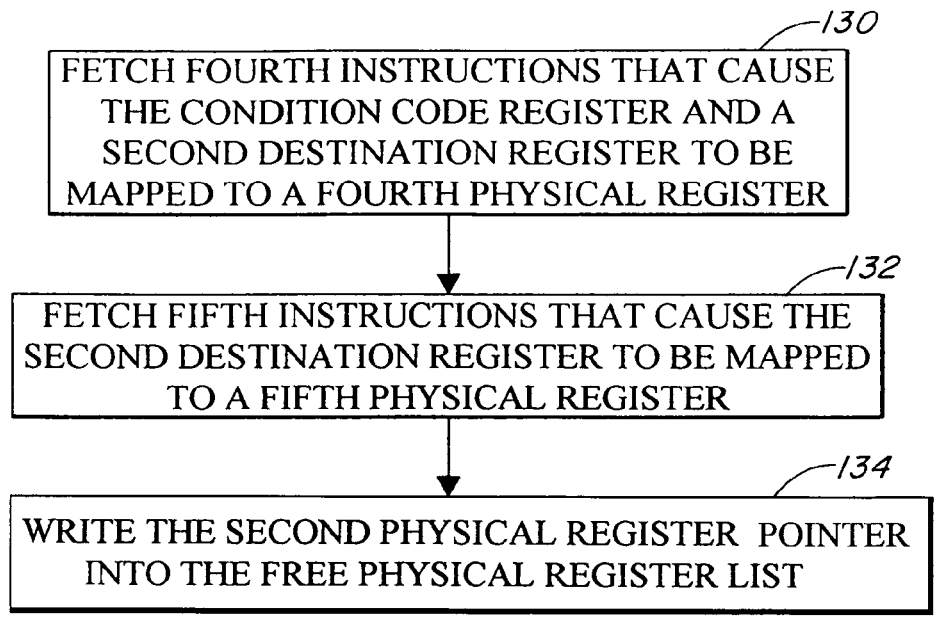
FIG. 8 shows a flowchart having instructions that may be appended to the instructions appearing in FIG. 7, in accordance with one embodiment of the present invention.

Two different sequences of instructions can appear after the instructions presented in FIG. 7. One sequence is addressed in FIG. 8, where a flowchart is shown which includes instructions that may be appended to the instructions appearing in FIG. 7. In step 130, a fourth instruction is fetched that causes the condition code register and a second destination register to be mapped to a fourth physical register. In step 132, a fifth instruction is also fetched that causes the second destination register to be mapped to a fifth physical register. Subsequently, in step 134, a pointer to the second physical register is removed from the hold register and written into the FPRL 20.

The first, third, fourth and fifth instruction are then executed, thereby producing a first instruction result, a third instruction result, a fourth instruction result, and a fifth instruction result. The first, third, fourth and fifth instruction results are buffered. After the step of buffering, the first, third, fourth, and fifth instruction are retired. The first physical register becomes eligible for reuse as a destination register after the third instruction retires.

Figure 9:
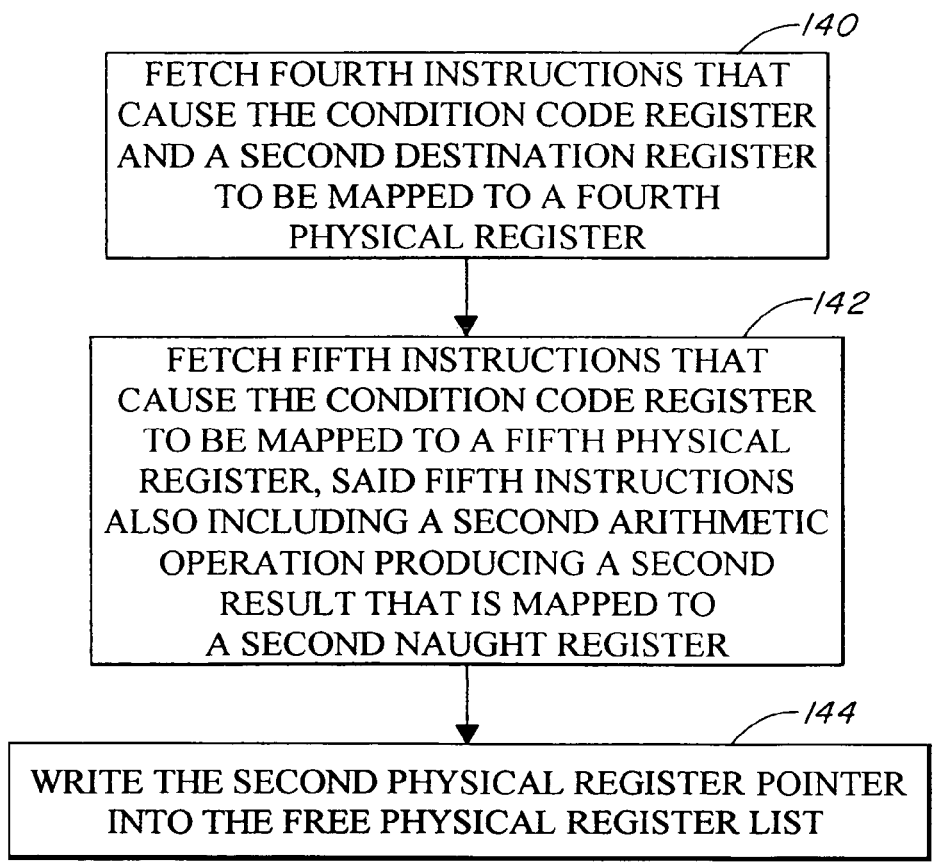
FIG. 9 shows another flowchart having instructions that may be appended to the instructions appearing in FIG. 7, in accordance with one embodiment of the present invention.

The other sequence of instructions that can appear after the instructions presented in FIG. 7 is addressed in FIG. 9, where a flowchart is shown which includes instructions that may be appended to the instructions appearing in FIG. 7. In step 140, a fourth instruction is fetched that causes the condition code register and a second destination register to be mapped to a fourth physical register. In step 142, a fifth instruction is fetched that causes the condition code register to be mapped to a fifth physical register. The fifth instruction also includes a second arithmetic operation producing a second result that is mapped to a naught register. Subsequently, in step 144, a pointer to the second physical register is removed from the hold register and written into the FPRL 20.

The first, third, fourth and fifth instruction are then executed, thereby producing a first instruction result, a third instruction result, a fourth instruction result, and a fifth instruction result. The first, third, fourth and fifth instruction results are buffered. The first, third, fourth, and fifth instruction are then retired after the step of buffering. The first physical register becomes eligible for reuse as a destination register after the third instruction retires.

Instead of the method outlined in FIG. 7, where a pointer to the first destination register is written into the FPRL 20, and a pointer to the condition code register is moved into a hold register, in another embodiment, the reverse can occur. That is, a pointer to the condition code register can be written into the FPRL 20, and a pointer to the first destination register can be moved into a hold register. In this different embodiment, the instructions in FIGS. 8 and 9 that append the instructions in FIG. 7 can be consistently modified by analogy.

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed:

1. A method for managing physical registers in a microprocessor, said method comprising the steps of:
   a) providing a free physical register list for holding information indicative of a status of the physical registers for managing the physical registers;
   b) fetching a first instruction that causes a first destination register to be mapped to a first physical register;
   c) fetching a second instruction that causes a condition code register and a second destination register to be mapped to a second physical register;
   d) fetching a third instruction that causes the condition code register and the first destination register to be mapped to a third physical register; and
   e) writing a pointer to the first physical register into the free physical register list,
   wherein the free physical register lists maintains a substantially constant number of physical register pointers.

2. The method of claim 1, further comprising
   f) fetching a fourth instruction that causes the second destination register to be mapped to a fourth physical register; and
   g) writing a pointer to the second physical register into the free physical register list.

3. The method of claim 2, further comprising
   executing the first, second, third, and fourth instruction, thereby producing a first instruction result, a second instruction result, a third instruction result, and a fourth instruction result; and
   buffering the first, second, third, and fourth instruction results.

4. The method of claim 3, further comprising
   after the step of buffering, retiring the first, second, third, and fourth instruction; and
   after the third instruction retires, allowing the first physical register to become eligible for reuse.

5. A method for managing physical registers in a microprocessor, said method comprising the steps of:
   a) providing a free physical register list for holding information indicative of a status of the physical registers;
   b) fetching a first instruction that causes a first destination register to be mapped to a first physical register;
   c) fetching a second instruction that causes a condition code register to be mapped to a second physical register, said second instruction also including an arithmetic operation producing a result that is mapped to a naught register;
   d) fetching a third instruction that causes the condition code register and the first destination register to be mapped to a third physical register;
   e) writing a pointer to the first physical register into the free physical register list; and
   f) moving a pointer to the second physical register into a hold register,
   wherein the pointer to the second register in the hold register is returned to the free physical register list when an instruction does not free a physical register.

6. The method of claim 5, further comprising
   g) fetching a fourth instruction that causes the condition code register and a second destination register to be mapped to a fourth physical register;
   h) fetching a fifth instruction that causes the second destination register to be mapped to a fifth physical register; and
   i) writing the pointer to the second physical register into the free physical register list.

7. The method of claim 6, further comprising
   executing the first, third, fourth and fifth instruction, thereby producing a first instruction result, a third instruction result, a fourth instruction result, and a fifth instruction result; and
   buffering the first, third, fourth and fifth instruction results.

8. The method of claim 7, further comprising
   after the step of buffering, retiring the first, third, fourth, and fifth instruction; and
   after the third instruction retires, allowing the first physical register to become eligible for reuse.

9. The method of claim 5, further comprising
   g) fetching a fourth instruction that causes the condition code register and a second destination register to be mapped to a fourth physical register;
   h) fetching a fifth instruction that causes the condition code register to be mapped to a fifth physical register, said fifth instruction also including a second arithmetic operation producing a second result that is mapped to a second naught register; and
   i) writing the pointer to the second physical register into the free physical register list.

10. The method of claim 9, further comprising
    executing the first, third, fourth and fifth instruction, thereby producing a first instruction result, a third instruction result, a fourth instruction result, and a fifth instruction result; and
    buffering the first, third, fourth and fifth instruction results.

11. The method of claim 10, further comprising
    after the step of buffering, retiring the first, third, fourth, and fifth instruction; and
    after the third instruction retires, allowing the first physical register to become eligible for reuse.

12. A method for managing physical registers in a microprocessor, said method comprising the steps of:
   a) providing a free physical register list for holding information indicative of a status of the physical registers;
   b) fetching a first instruction that causes a first destination register to be mapped to a first physical register;
   c) fetching a second instruction that causes a condition code register to be mapped to a second physical register, said second instruction also including an arithmetic operation producing a result that is mapped to a naught register;
   d) fetching a third instruction that causes the condition code register and the first destination register to be mapped to a third physical register;
   e) writing a pointer to the second physical register into the free physical register list; and
   f) moving a pointer to the first physical register into a hold registers,
   wherein the pointer to the first register in the hold register is returned to the free physical register list when an instruction does not free a physical register.

13. The method of claim 12, further comprising
   g) fetching a fourth instruction that causes the condition code register and a second destination register to be mapped to a fourth physical register;
   h) fetching a fifth instruction that causes the second destination register to be mapped to a fifth physical register; and
   i) writing the pointer to the first physical register into the free physical register list.

14. The method of claim 13, further comprising
   executing the first, third, fourth and fifth instruction, thereby producing a first instruction result, a third instruction result, a fourth instruction result, and a fifth instruction result; and
   buffering the first, third, fourth and fifth instruction results.

15. The method of claim 14, further comprising
   after the step of buffering, retiring the first, third, fourth, and fifth instruction; and
   after the third instruction retires, allowing the physical register to become eligible for reuse.

16. The method of claim 12, further comprising
   g) fetching a fourth instruction that causes the condition code register and a second destination register to be mapped to a fourth physical register;
   h) fetching a fifth instruction that causes the condition code register to be mapped to a fifth physical register, said fifth instruction also including a second arithmetic operation producing a second result that is mapped to a second naught register; and
   i) writing the pointer to the first physical register into the free physical register list.

17. The method of claim 16, further comprising
   executing the first, third, fourth and fifth instruction, thereby producing a first instruction result, a third instruction result, a fourth instruction result, and a fifth instruction result; and
   buffering the first, third, fourth and fifth instruction results.

18. The method of claim 17, further comprising
   after the step of buffering, retiring the first, third, fourth, and fifth instruction; and
   after the third instruction retires, allowing the first physical register t0o become eligible for reuse.

19. A system for managing physical registers in a microprocessor, said system comprising
   a free physical register list;
   a memory array for storing first, second, and third instructions; and
   a instruction fetching unit for
      fetching the first instruction that causes a first destination register to be mapped to a first physical register;
      fetching the second instruction that causes a condition code register and a second destination register to be mapped to a second physical register; and
      fetching the third instruction that causes the condition code register and the first destination register to be mapped to a third physical register;
      wherein a pointer to the first physical register is written into the free physical register list, and the free physical register list maintains a substantially constant number of physical register pointers.

20. The system of claim 19, wherein the instruction fetching unit fetches a fourth instruction stored in the memory array that causes the second destination register to be mapped to a fourth physical register, after which a pointer to the second physical register is written into the free physical register list.

21. The system of claim 20, further comprising
   an execution unit executing the first, second, third, and fourth instruction, thereby producing a first instruction result, a second instruction result, a third instruction result, and a fourth instruction result; and
   a buffer for storing the first, second, third, and fourth instruction results.

22. The system of claim 21, further comprising a retirement unit for retiring the first, second, third, and fourth instruction after the buffer stores the instruction results, wherein the first physical register becomes eligible for reuse after the third instruction retires.

23. A system for managing physical registers in a microprocessor, said system comprising
   a free physical register list;
   a memory array for storing first, second, and third instructions; and
   a instruction fetching unit for
      fetching the first instruction that causes a first destination register to be mapped to a first physical register;
      fetching the second instruction that causes a condition code register to be mapped to a second physical register, said second instruction also including an arithmetic operation producing a result that is mapped to a naught register; and
      fetching the third instruction that causes the condition code register and the first destination register to be mapped to a third physical register;
      wherein a pointer to the first physical register is written into the free physical register list, and a pointer to the second physical register is moved into a hold register, and wherein the pointer to the second register in the hold register is returned to the free physical register list when an instruction does not free a physical register.

24. The system of claim 23, wherein the instruction fetching unit fetches a fourth instruction stored in the memory array that causes the condition code register and a second destination register to be mapped to a fourth physical register, and fetches a fifth instruction stored in the memory array that causes the second destination register to be mapped to a fifth physical register, after which the pointer to the second physical register is written into the free physical register list.

25. The system of claim 24, further comprising
an execution unit executing the first, third, fourth and fifth instruction, thereby producing a first instruction result, a third instruction result, a fourth instruction result, and a fifth instruction result; and
a buffer for storing the first, third, fourth, and fifth instruction results.

26. The system of claim 25, further comprising a retirement unit for retiring the first, third, fourth, and fifth instruction after the buffer stores the instruction results, wherein the first physical register becomes eligible for reuse after the third instruction retires.

27. The system of claim 23, wherein the instruction fetching unit fetches a fourth instruction stored in the memory array that causes the condition code register and a second destination register to be mapped to a fourth physical register, and fetches a fifth instruction stored in the memory array that causes the condition code register to be mapped to a fifth physical register, said fifth instruction also including a second arithmetic operation producing a second result that is mapped to a second naught register, after which the pointer to the second physical register is written into the free physical register list.

28. The system of claim 27, further comprising
an execution unit executing the first, third, fourth and fifth instruction, thereby producing a first instruction result, a third instruction result, a fourth instruction result, and a fifth instruction result; and
a buffer for storing the first, third, fourth, and fifth instruction results.

29. The system of claim 28, further comprising a retirement unit for retiring the first, third, fourth, and fifth instruction after the buffer stores the instruction results, wherein the first physical register becomes eligible for reuse after the third instruction retires.

30. A system for managing physical registers in a microprocessor, said system comprising
a free physical register list;
a memory array for storing a first, second, and third instruction; and
a instruction fetching unit for
fetching the first instruction that causes a first destination register to be mapped to a first physical register;
fetching the second instruction that causes a condition code register to be mapped to a second physical register, said second instruction also including an arithmetic operation producing a result that is mapped to a naught register; and
fetching the third instruction that causes the condition code register and the first destination register to be mapped to a third physical register;
wherein a pointer to the second physical register is written into the free physical register list, and a pointer to the first physical register is moved into a hold register, and wherein the pointer to the first register in the hold register is returned to the free physical register list when an instruction does not free a physical register.

31. The system of claim 30, wherein the instruction fetching unit fetches a fourth instruction stored in the memory array that causes the condition code register and a second destination register to be mapped to a fourth physical register, and fetches a fifth instruction stored in the memory array that causes the second destination register to be mapped to a fifth physical register, after which the pointer to the first physical register is written into the free physical register list.

32. The system of claim 31, further comprising
an execution unit executing the first, third, fourth and fifth instruction, thereby producing a first instruction result, a third instruction result, a fourth instruction result, and a fifth instruction result; and
a buffer for storing the first, third, fourth, and fifth instruction results.

33. The system of claim 32, further comprising a retirement unit for retiring the first, third, fourth, and fifth instruction after the buffer stores the instruction results, wherein the first physical register becomes eligible for reuse after the third instruction retires.

34. The system of claim 30, wherein the instruction fetching unit fetches a fourth instruction stored in the memory array that causes the condition code register and a second destination register to be mapped to a fourth physical register, and fetches a fifth instruction stored in the memory array that causes the condition code register to be mapped to a fifth physical register, said fifth instruction also including a second arithmetic operation producing a second result that is mapped to a second naught register, after which the pointer to the first physical register is written into the free physical register list.

35. The system of claim 34, further comprising
an execution unit executing the first, third, fourth and fifth instruction, thereby producing a first instruction result, a third instruction result, a fourth instruction result, and a fifth instruction result; and
a buffer for storing the first, third, fourth, and fifth instruction results.

36. The system of claim 35, further comprising a retirement unit for retiring the first, third, fourth, and fifth instruction after the buffer stores the instruction results, wherein the first physical register becomes eligible for reuse after the third instruction retires.

* * * * *